United States Patent [19]

Jorgensen

[11] 4,234,094
[45] Nov. 18, 1980

[54] GRIDWORKS STORAGE SYSTEM

[75] Inventor: Carsten Jorgensen, Koge, Denmark

[73] Assignee: Copco, Inc., New York, N.Y.

[21] Appl. No.: 15,581

[22] Filed: Feb. 27, 1979

[51] Int. Cl.$^3$ ............................. A47F 5/01; A47F 5/08
[52] U.S. Cl. ........................................ 211/88; 211/106; 248/220.2; 403/391
[58] Field of Search ............... 211/88, 87, 106, 181; 403/391, 386, 389; 24/73 SP, 81 CR, 81 G, 85 R, 85 G; 248/73, 220.2, 222.4; 52/681, 682, 683, 686, 689

[56] References Cited

U.S. PATENT DOCUMENTS

| 3,094,892 | 6/1963 | Topf | 248/220.2 X |
| 3,228,640 | 1/1966 | Wolsh | 24/81 G X |

FOREIGN PATENT DOCUMENTS

| 231649 | 6/1963 | Austria | 211/88 |
| 1429662 | 11/1968 | Fed. Rep. of Germany | 211/106 |
| 1478879 | 3/1967 | France | 211/106 |
| 1230856 | 5/1971 | United Kingdom | 211/106 |

*Primary Examiner*—Roy D. Frazier
*Assistant Examiner*—Robert W. Gibson, Jr.
*Attorney, Agent, or Firm*—Michael Ebert

[57] ABSTRACT

A gridworks storage system for a kitchen or any other room requiring wall-mounted storage facilities, the system being constituted by one or more grid modules formed of a network of intersecting wires in selective combination with wire-formed shelves, racks, bins and other accessory components. The module is attached to the wall by a set of columnar brackets whose hollow, resilient heads are split to define a pair of key-hole slots having inlets which are yieldable to permit a grid wire, at the point of attachment, to be forced into and trapped within the circular socket of the slot. The accessory components are connected to the grid module by double-headed couplers, each resilient head of which is split to define key-hole slots having yieldable inlets for linking a wire of the component to the grid module.

9 Claims, 13 Drawing Figures

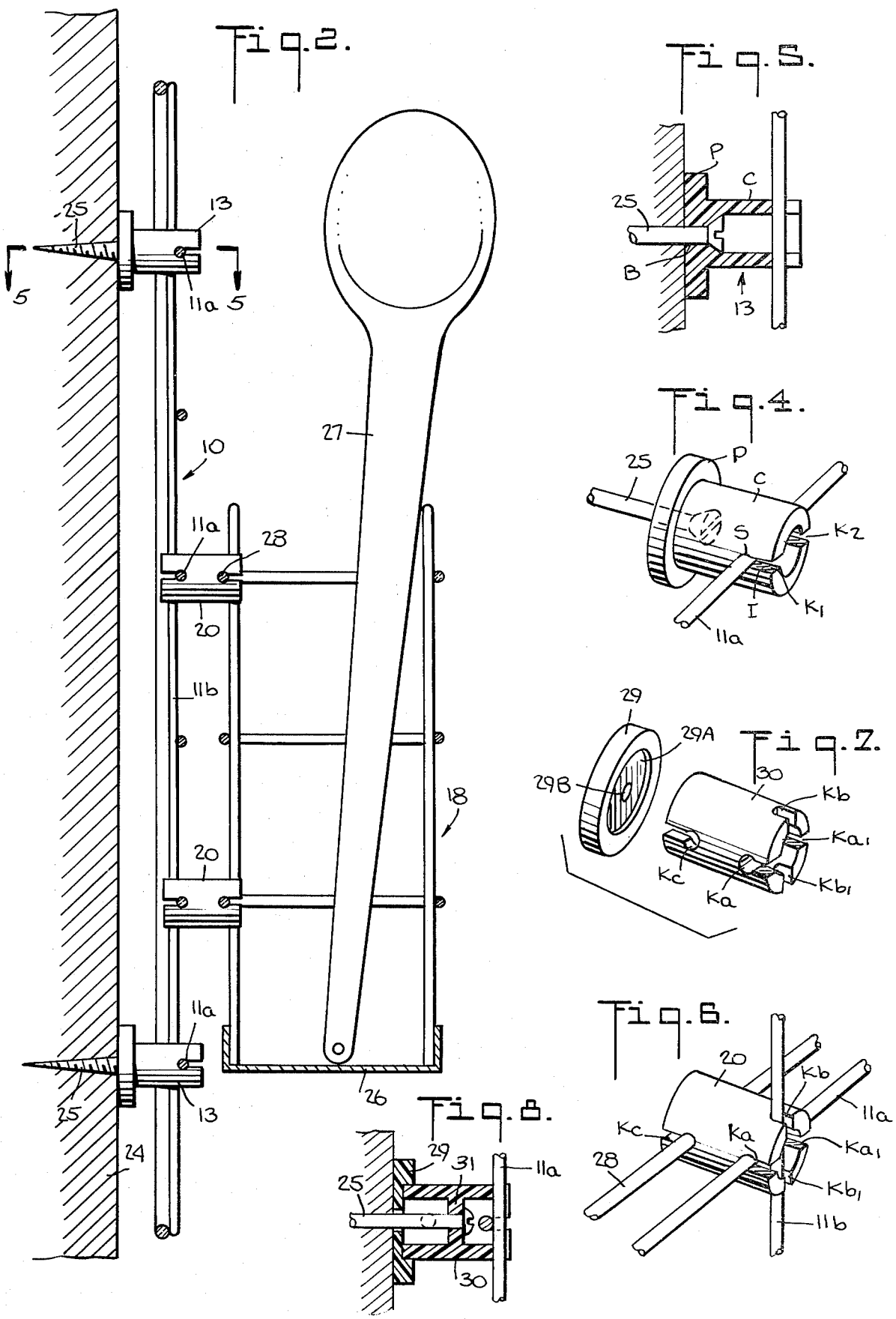

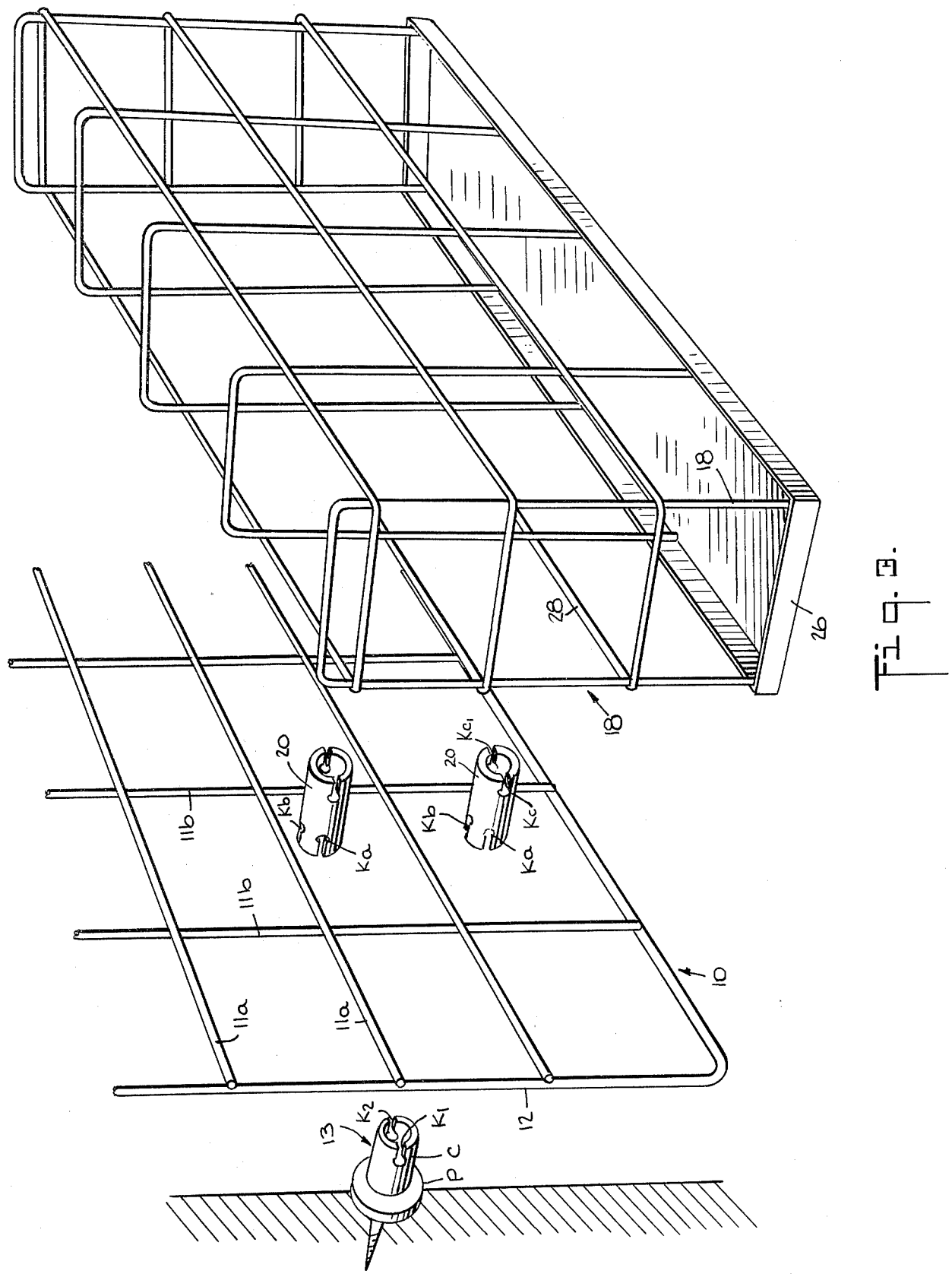

GRIDWORKS STORAGE SYSTEM

BACKGROUND OF INVENTION

This invention relates generally to a gridworks system in which a grid module formed of a network of intersecting wires is selectively combined with wire-formed shelves, racks, bins and other accessory components to create a wall-mounted storage facility of any desired capacity, and more particularly to a system of this type in which the modules are readily attached to the wall by single-headed columnar brackets and the components are connected to the module by double-head columnar couplers.

Modern industrial society is characterized by a high degree of mobility. Individuals and families no longer spend a good part of their lives in permanent dwellings but are frequently on the move. Since many wage earners in the United States are employed by large corporations with plants and officers scattered throughout the country and in some cases abroad, it is not uncommon for an employee to be transferred every two or three years to a new location. The modern American lifestyle is largely dictated by this impermanence.

Thus when a modern family occupies a new home and makes changes to accommodate the dwelling to its needs, it does so with an awareness that these changes must be transitory in character. When the time comes to move, one should be able to quickly remove whatever has been installed and transfer the installation to a new site. For example, a family entering an urban apartment would be ill-advised to install permanent cabinet shelves and other storage facilities; for when it is necessary to pull up stakes, one should be able, without difficulty, to dismantle and transfer the installation.

This mobility factor accounts for the popularity of so-called knock-down furniture; for such pieces are composed of components which can be quickly assembled and thereafter dismantled for storage or shipment in a compact state at a significantly lower cost than with conventional fixed articles of funiture.

Moreover, because of rising construction costs, modern dwellings afford relatively limited living areas and it becomes necessary to exploit available wall spaces for storage purposes. When, therefore, the kitchen cabinets in a dwelling are inadequate to store pots and pans, it is the common practice to suspend these articles by hooks from the wall. In this way, the kitchen utensils not only form part of the kitchen decor but are more readily accessible. However, the need for a large number of anchor hooks at various points in the wall presents obvious practical difficulties.

Similar problems arise in storing cosmetics and other items in a bathroom, in storing playthings in a child's room and in storing tools in a work room when the existing cabinets or shelves and other storage facilities are inadequate for this purpose.

SUMMARY OF INVENTION

In view of the foregoing, the primary object of this invention is to provide a gridworks system for a kitchen or other room requiring a storage facility, which system may readily be installed or dismantled.

More particularly, it is an object of this invention to provide a gridworks storage system constituted by one or more wire-grid modules in selective combination with wire-formed shelves, bins, racks and other accessory components, which modules may be easily and securely attached to a wall by a set of single-headed columnar brackets, the components being quickly connectable to the modules by double-headed columnar couplers.

A significant advantage of the invention is that the system lends itself to a great variety of combinations and makes it possible to organize any desired storage facility to meet the special needs of the user.

A gridworks system in accordance with the invention is compatible with any existing room style in that the open-wire formed system exposes the underlying wall and does not obscure or conflict with the room decor, but functions mainly to support and reveal the articles stored therein and to provide ready access to these articles.

Also an object of the invention is to provide a storage system in which each grid module is attached to the wall by a set of four columnar brackets, each secured to the wall by a single screw or anchor bolt inserted in the wall whereby when it becomes necessary to dismantle the installation, the number of wall holes which remain is relatively small and easily patched to restore the wall to its original condition.

Yet another object of this invention is to provide a knock-down gridworks storage system which may be manufactured and sold at relatively low cost, and which can be stored and shipped in a compact state.

Briefly stated, these objects are attained in a gridworks storage system in accordance with the invention composed of one or more grid modules in selective combination with one or more accessory components, the modules being attachable to a wall and the components being connectable to the modules.

Each grid module is formed by a network of intersecting wires and is attached to a wall so that it lies in parallel relation thereto by means of a set of hollow columnar brackets, each being fastened to the wall by means of a single screw or anchor bolt which passes through the column and is concealed thereby. The resilient head of the bracket is split to define a pair of diametrically-opposed key-hole slots whose inlets are yieldable to permit the grid wire, at the point of attachment, to be forced into and trapped within the circular socket of the slot.

The accessory components are constituted by wire-formed bins, shelves, racks or other open-wire structure suitable for receiving items to be stored, and are quickly connected to the modules by double-headed columnar couplers whose hollow resilient heads are split to define key-hole slots having yieldable inlets for linking a wire of the components to the grid module.

OUTLINE OF DRAWINGS

For a better understanding of the invention as well as other objects and further features thereof, reference is made to the following detailed description to be read in conjunction with the accompanying drawings, wherein:

FIG. 1A shows the basic grid module included in the system in accordance with the invention, which module is shown vertically-mounted by brackets on a wall;

FIG. 1B shows the same vertically-mounted module with tools suspended therefrom;

FIG. 1C shows the basic grid module when it is horizontally-mounted on a wall and has cooking pans suspended therefrom;

screw 25. In practice, instead of a screw, an anchor bolt or other suitable anchoring means, depending on whether the wall is of hollow or solid wall masonry construction, may be used to secure the brackets thereto.

The bracket is molded or otherwise formed of a resilient synthetic plastic material such as nylon, polyvinyl chloride, polyethylene or polypropylene. The head of column C is split by a pair of diametrically-opposed key-hole slots $K_1$ and $K_2$, each having a straight line inlet I (see FIG. 4) whose width is somewhat smaller than the diameter of wire $11a$ that is to be anchored by the bracket. Inlet I leads to a circular socket, such as socket S shown in FIG. 4, whose diameter substantially matches that of the wire $11a$ which has a circular cross section.

Because of its resilient construction, the split head inlets of the bracket are yieldable to permit sufficient dilation thereof for the installer of the grid to force the wire through the inlet into sockets S of the key-hole slots, thereby trapping the wire in the sockets of the slots and effectively locking the grid module to the bracket.

In practice, one may first attach four brackets to the horizontal wires of a grid module at appropriate positions adjacent the corners of the module, and then place the module against the wall where it is to be mounted, with the pedestals of the brackets pressed against the wall. In this way, one can mark the bracket location on the wall.

Then holes are drilled in the wall at the bracket locations. The brackets, after being taken off the module, are screwed or anchor-bolted to the wall at the hole sites. The module may now be coupled to the brackets on the wall by pressing the horizontal wires into the bracket key-hole slots. To thereafter remove the module, one simply pulls the horizontal wires out of the keyhole slots.

Because the mounting screws or bolts are buried within the brackets, and the brackets have a columnar form and lie behind the module, the module attachments to the wall are inconspicuous and the module presents a neat and attractive appearance.

Coupler

Referring now to FIG. 6, there is shown a coupler 20 in accordance with the invention for connecting wire-formed accessory components such as component 18 in FIGS. 2 and 3 having a horizontal wire 28, to the module 10 at an intersection of wires $11a$ and $11b$ of the grid network of the module.

To this end, coupler 20 is constituted by a double-headed hollow column formed of the same resilient material as the bracket, one head having two pairs of key-hole slots, $Ka-Ka_1$ and $Kb-Kb_1$ at diametrically-opposed positions, each pair lying in a diametrical plane at right angles to the other plane. The opposing head is split to define a single pair of key-hole slots $Kc$ and $Kc_1$ in registration with slots $Ka$ and $Ka_1$ on the first head.

Thus as shown in FIG. 6, the head of the coupler having two pairs of slots at right angles to each other can be secured to the module at the intersection of wires $11a$ and $11b$, wire $11a$ being locked into slots $11a$ and $11a_1$, and wire $11b$ being locked into slots $11b$ and $11b_1$. In this way, coupler 20 is stably anchored on the module at an intersection point thereon and is incapable of being tilted or otherwise displaced.

Wire 28 of the accessory component 18 is locked into key-hole slots $Kc$ and $Kc_1$ on the other end of the coupler, thereby linking the component to the module. As many couplers are used as is necessary to firmly link the accessory component to the grid module. Moreover, one may link a second accessory component in front of the first component by the couplers. Thus a shelf component may be held onto a bin component linked to the module.

Bracket-Coupler Assembly

In the previously described embodiment, the bracket and couplers are distinct, independent elements of different design. Hence an installer of a system requires an appropriate number of both couplers and brackets.

FIGS. 7 and 8 show a dual-function bracket-coupler assembly capable of functioning as either a mounting bracket for anchoring a module on the wall or as a coupler for connecting an accessory component to the mounted module. The assembly is constituted by a disc-shaped pedestal 29 having a circular well 29A therein dimensioned to receive and nest one end of a cylindrical, double-headed coupler 30, one head of which is provided with two pairs of key-hole slots $Ka-Ka_1$ and $Kb-Kb_1$ corresponding to the same slots on coupler 20 in FIG. 6, the other head having a single pair of slots $Kc$ and $Kc_1$ (not visible in FIG. 7).

Coupler 30 is provided with an interior septum 31 having a hole therein which registers with the central hole 29B in pedestal 29.

When the assembly is to function as a bracket, the coupler element 30 is combined with the pedestal element 29 and a screw 25 passing through the hole in septum 31 is projected into bore 29B of the pedestal for insertion in the wall, in this way joining the pedestal to the coupler. But when a coupler is required, one discards pedestal 29 and makes use only of the coupler element 30. Thus an installer need only be supplied with coupler and pedestal elements, these being used in combination or singly, as required.

While there have been shown and described preferred embodiments of a gridworks storage system in accordance with the invention, it will be appreciated that many changes and modifications may be made therein without, however, departing from the essential spirit thereof.

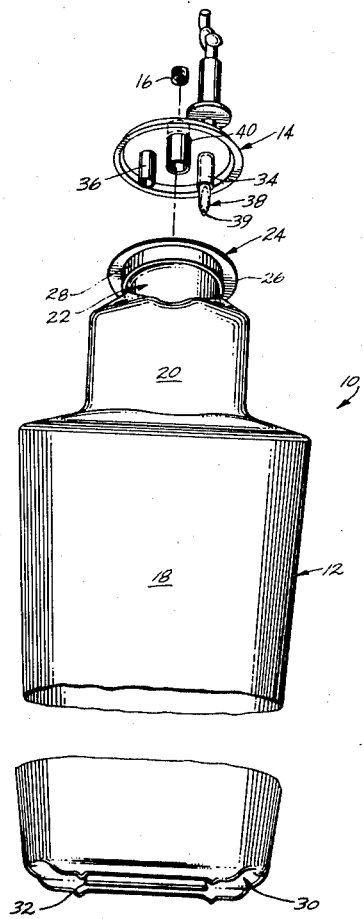

I claim:

1. A gridworks storage system for a kitchen or other area requiring a wall-mounted storage facility for utensils and other items, the system including at least one grid module formed by a network of intersecting round wires, and a set of brackets to attach said module to a wall, each bracket having a pedestal which lies against the wall and a hollow column formed of resilient material projecting outwardly from the pedestal, said pedestal having a central bore therein to receive a mounting screw or anchor bolt for insertion in the wall, said column having a split head to define a pair of diametrically-opposed key-hole slots whose inlets have a normal width smaller than the diameter of said wires and whose circular sockets have a diameter substantially matching the wire diameter, the inlets being dilatable to permit a grid wire at an attachment point to be forced into and locked within said slots.

2. A system as set forth in claim 1, wherein said module has a rectangular form and said set consists of four brackets, one adjacent each corner of the module.

3. A system as set forth in claim 1, wherein said system further includes at least one wire-formed accessory component adapted to provide a receptacle for said items, and couplers for linking said components to said module whereby said system is a combination of at least one module and one component.

4. A system as set forth in claim 3, wherein said component is a rack.

5. A system as set forth in claim 3, wherein said component is a bin.

6. A system as set forth in claim 3, wherein said component is a shelf.

7. A system as set forth in claim 3, wherein said coupler is a hollow column of resilient material, one head of which is provided with orthogonally-arranged pairs of dilatable key-hole slots adapted to engage a wire intersection on said module, the other head having a single pair of keyhole slots adapted to engage a wire of said component.

8. A system as set forth in claim 1, wherein said brackets are each formed by a pedestal integral with said column.

9. A system as set forth in claim 7, wherein said coupler column includes a septum having a base therein, said coupler being convertible into a bracket for mounting said module on said wall by joining it to a separate pedestal having a central hole therein, the screw passing through said septum and projecting into the pedestal bore.

* * * * *

United States Patent [19]

Safianoff

[11] 4,234,095
[45] Nov. 18, 1980

[54] COLLECTION CONTAINER FOR STERILE LIQUIDS

[75] Inventor: Albert Safianoff, Rancho Palos Verdes, Calif.

[73] Assignee: Alpha Therapeutic Corporation, South Pasadena, Calif.

[21] Appl. No.: 13,446

[22] Filed: Feb. 21, 1979

[51] Int. Cl.³ .............................................. B65D 41/20
[52] U.S. Cl. .................................. 215/232; 156/73.1; 215/308; 215/309; 128/272
[58] Field of Search ....................... 141/286, 329, 330; 215/232, 250, 253, 308, 309; 128/272, 272.3, 214 D; D24/56

[56] References Cited

U.S. PATENT DOCUMENTS

| | | | |
|---|---|---|---|
| D. 236,918 | 9/1975 | McPhee | D9/10 X |
| 3,215,299 | 11/1965 | Coanda | 128/272 X |
| 3,525,454 | 8/1970 | Frederiksen | 156/73.1 X |
| 3,602,257 | 8/1971 | Berleyoung | 156/73.1 X |
| 3,878,962 | 4/1975 | Holbrook | 215/309 |
| 3,920,503 | 11/1975 | Keeler | 215/232 X |
| 3,938,686 | 2/1976 | Milligan | 215/232 |
| 3,944,261 | 3/1976 | Reed | 156/73.1 X |
| 3,952,902 | 4/1976 | Prouty | 215/308 X |
| 3,957,168 | 5/1976 | Shine | 215/1 C |
| 4,049,034 | 9/1977 | Vcelka | 215/232 X |

*Primary Examiner*—Donald F. Norton
*Attorney, Agent, or Firm*—Christie, Parker & Hale

[57] ABSTRACT

A collection container 10 for sterile liquids, such as blood plasma, of a thermoplastic material having specially designed receptacles in the top for receiving the connecting tubes of a liquid transfer apparatus and for providing a permanent venting arrangement. The container comprises a bottle body 12 of clear polypropylene and a top portion 14 secured to the mouth of the body having pre-formed sleeves 34, 36, 40 depending from the interior side of the top. One of the sleeves 40 provides a venting aperture and locates a plug of venting material. The other sleeves 34, 36 receive the connecting tubes or plungers 38 of the transfer apparatus. The top portion and mouth of the bottle are provided with mating protuberances 42, 44 to facilitate joining by sonic welding.

14 Claims, 5 Drawing Figures